Dec. 27, 1927.

W. R. TOMPKINS

ENGINE BALANCE

Filed May 13, 1925    2 Sheets-Sheet 1

1,654,515

WITNESSES

INVENTOR
W. R. Tompkins,
BY
ATTORNEYS

Dec. 27, 1927.
W. R. TOMPKINS
1,654,515
ENGINE BALANCE
Filed May 13, 1925      2 Sheets-Sheet 2
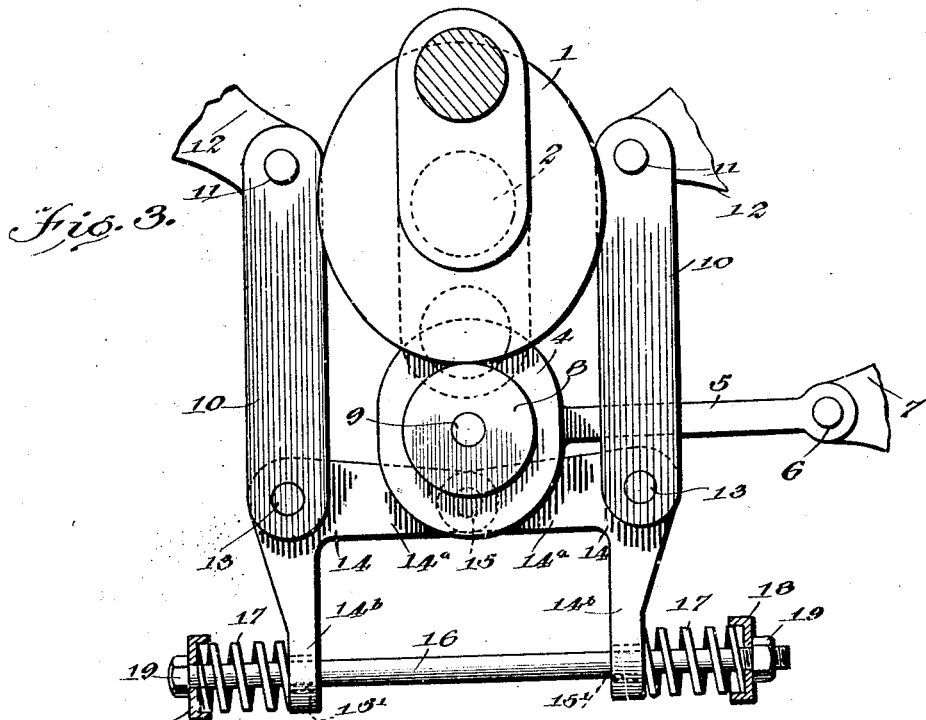
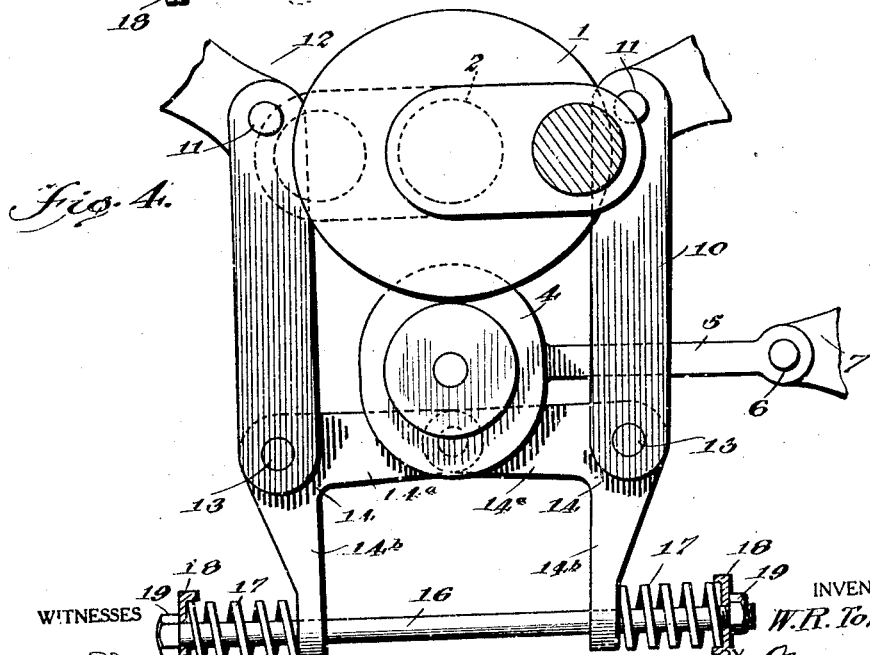
INVENTOR
W. R. Tompkins,
ATTORNEYS Patented Dec. 27, 1927.

1,654,515

UNITED STATES PATENT OFFICE.

WILLIAM ROY TOMPKINS, OF RANKIN, ILLINOIS.

ENGINE BALANCE.

Application filed May 13, 1925. Serial No. 30,059.

The invention relates to the balancing of reciprocating machinery, particularly reciprocating internal combustion engines, and it consists in the combinations, constructions and arrangements herein described and claimed.

An object of the invention is the provision of a simple, reliable and positively acting device which affords facilities for counteracting or neutralizing the forces which tend to cause vibrations in a four cylinder engine.

A further object of the invention is the provision of a balancing device which is adapted to be actuated by the rotation of the crank shaft of a reciprocating engine to set up forces equal to and acting in opposition to the forces which tend to cause the vibrations of the engine during each complete rotation of the crank shaft.

Figure 1:
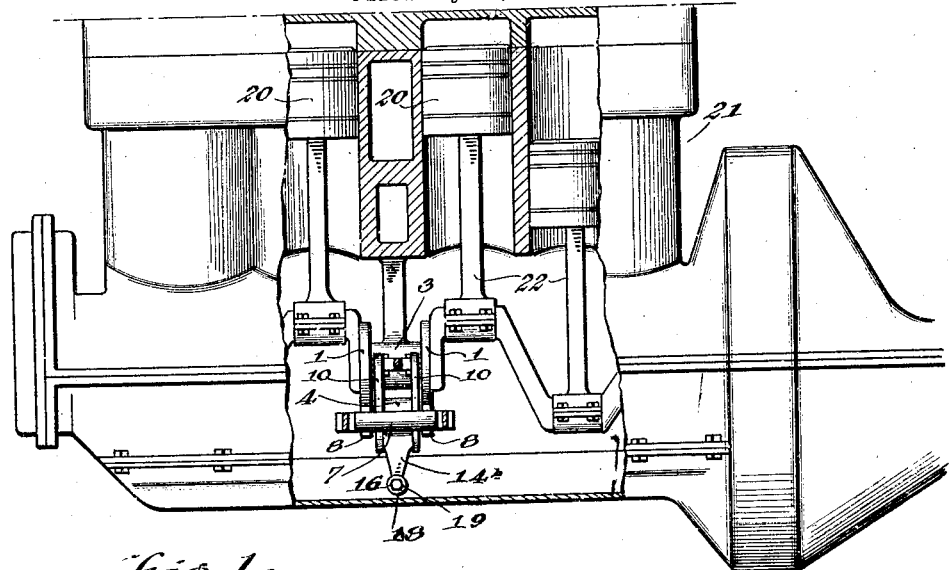

Other objects and advantages of the invention will be apparent from the following description, considered in conjunction with the accompanying drawings, in which Figure 1 is a side elevation of a four cylinder reciprocating engine equipped with a balancing device embodying the invention, portions of the engine block being broken away to show the position of the device with respect to the crank shaft and primary reciprocating parts of the engine.

Figure 2:
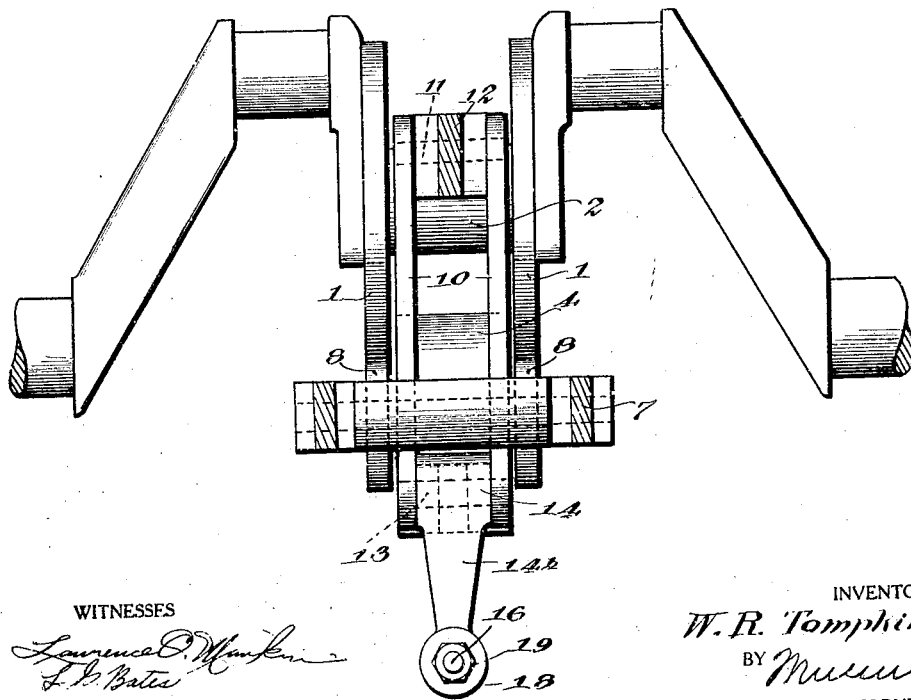

Figure 2 is a side elevation of a portion of the crank shaft, showing the device applied thereto, Figure 3 is a transverse vertical section through the crank shaft showing the balancing device in elevation and showing the crank arms in a vertical plane, and Figure 4 is a view similar to Figure 3, showing the crank arms in a horizontal plane.

In the drawings, I show the device applied to the crank shaft of a four cylinder internal combustion engine operating on a four stroke cycle. In an engine of the type illustrated in the drawing, each complete rotation of the crank shaft ordinarily is attended by two complete secondary vibrations of the engine. In an engine of the type just described, the cranks are positioned 180° apart and the forces which are set up when the crank shaft is rotated and which tend to cause the two secondary vibrations during each complete rotation of the crank shaft act substantially along a line parallel to the direction of reciprocation of the pistons of the engine, such forces resulting from the shifting of the center of gravity of the combined primary reciprocating parts and the crank shaft of the engine as the crank shaft rotates. In an engine of the type illustrated in Figure 1, this shifting of the center of gravity of the combined primary reciprocating parts of the engine takes place along a substantially vertical line during each rotation of the crank shaft.

In carrying out the invention, I prefer to make use of a pair of identical cams 1 which are fixed rigidly to the crank shaft 2 of the engine, preferably at the opposite ends of the main center bearing 3 for the crank shaft. The cams 1 may be formed integrally with the crank shaft and have the form of plates which are elliptical in outline, the major axis of each cam comprising two relatively long lines of equal length extending radially from the axis of rotation of the crank shaft in the plane of the crank arms of the crank shaft while the minor axis of each cam 1 comprises two shorter equal lines extending radially from the axis of rotation of the crank shaft in a plane which extends at right angles to the plane of the crank arms of the crank shaft.

This arrangement contemplates the turning of the cams with the crank shaft at the same speed as the crank shaft and the forming of the cams with regularly curved peripheral surfaces. If provision should be made to rotate the cams at a speed twice that of the crank shaft, each cam would be formed with only one long radius and one short radius which will be in line with the relatively long radius whereas each cam would be formed with four relatively long radii of equal length and four shorter radii of equal length alternating with the relatively long radii if provision should be made to rotate the cams at one-half the speed of rotation of the crank shaft.

A weight 4 is disposed below the main bearing 3 of the crank shaft and is supported at one end of a relatively long vertically swingable arm 5 which is supported at its other end on a horizontal pivot element 6 secured to an inwardly projecting lug 7 on the engine block or to any other suitable fixed support. Rollers 8 are rotatably supported on aligned pivot elements 9 which extend from opposite sides of the weight 4 centrally of the latter. The respective rollers 8 have their peripheral surfaces in rolling contact with the peripheral surfaces of the corresponding cams 1. Hanger bars 10 are supported at their upper ends on horizontal pivot elements 11 which are carried by lugs 12 or other attaching members which are fast to the engine block. Pairs of the hanger bars 10 depend on opposite sides of the main bearing 3 for the crank shaft and on opposite sides of the weight 4. The lower end portions of these pairs of hanger bars support horizontal pivot elements 13 which are parallel with each other, with the pivot element 6 and with the axis of rotation of the crank shaft. Bell-cranks 14 are fulcrumed on the pivot elements 13 between the hanger bars 10 of the respective pairs of hanger bars. These bell cranks 14 have arms 14$^a$ overlapping at their extremities and pivotally attached to each other and to the lower portion of the weight 4 by a horizontal pivot element 15 which is parallel to the axis of rotation of the crank shaft. The other arms of the bell-cranks are indicated at 14$^b$ and are provided adjacent to their extremities with openings 15 through which a rod 16 extends loosely. Similar expansion springs 17 are disposed on the end portions of the rod 16 at the outer sides of the arms 14$^b$ of the bell-cranks. Each expansion spring 17 reacts at its inner end against the adjacent arm 14$^b$ of the adjacent bell-crank and at its outer end against a stop washer 18 which is retained in adjusted position on the rod 16 by means of a nut 19 which is in threaded engagement with the rod 16.

From the foregoing description of the various parts of the device, the operation thereof may be readily understood. The springs 17 will act on the bell-cranks to hold the rollers 8 continuously in rolling contact with the peripheral surfaces of the cams 1. The weight supporting arm 5 is relatively long and since the extent of vertical movement of the weight during a complete rotation of the crank shaft is slight, the weight will move during a complete rotation of the crank shaft in a path which is substantially in line with the direction of reciprocation of the pistons 20 of the engine 21 which is shown in the drawings as being equipped with the invention.

Only three of the pistons 20 of the engine 21 are shown in Figure 1 of the drawing but it will be understood that the engine illustrated in Figure 1 has four pistons and that each of these pistons is connected with the crank shaft by means of a connecting rod 22. The weight will move in response to the action of the cams 1 on the rollers 8 as the crank shaft rotates in a path which is substantially in line with the line along which forces tending to cause secondary vibrations of the engine are exerted. In other words, the weight will shift as the crank shaft rotates along a path which is substantially in line with the path along which the center of gravity of the combined reciprocating parts and crank shaft of the engine shifts as the crank shaft rotates. However, the direction of movement of the weight is opposite to the direction of shifting of the center of gravity of the combined reciprocating parts and crank shaft of the engine so that the forces which tend to cause secondary vibrations of the engine will be balanced and neutralized by forces set up by the shifting of the weight. The engine therefore will operate smoothly and without the usual secondary vibrations when a practical embodiment of the invention, such as has been described in the foregoing, is applied to the engine.

While I have shown the invention as applied to a four cylinder internal combustion engine in which the line of shifting of the center of gravity of the combined reciprocating parts and crank shaft is in a vertical plane, it will be manifest that the invention is equally applicable to other reciprocating machinery, as for example to an eight cylinder engine of the V type in which the direction of shifting of gravity of the reciprocating parts and of the crank shaft is in a horizontal plane, the invention then being embodied in a construction which supports the weight 4 for shifting substantially in a horizontal plane and of course in opposition to the direction of shifting of the center of gravity of the reciprocating parts and crank shaft of the eight cylinder engine.

It will be understood of course that the cams and the weight need not be applied to the crank shaft at the center bearing but may be distributed along the crank shaft equi-distant from a vertical line passing through the crank shaft at the point at which the line of shifting of the center of gravity of the reciprocating parts and the crank shaft intersect the crank shaft. The forces which tend to cause the secondary vibrations of the engine vary as the crank shaft is rotated. The construction which the invention provides as illustrated in the drawings and as hereinbefore described and consisting of the cams in rolling contact with the rollers which are carried by the spring actuated weight sets up forces which vary directly as the forces that tend to cause the secondary vibrations vary and therefore the balancing action of the device is uniform throughout the complete rotation of the crank shaft.

Obviously, my invention is susceptible of embodiment in forms other than that illustrated in the accompanying drawings and I therefore consider as my own all such modifications and adaptations of the form of the device herein described as fairly fall within the scope of the appended claims.

I claim:—

1. A device for balancing the secondary forces of a reciprocating engine, comprising a cam carried by the crank shaft of the engine and having a regularly curved peripheral surface at the outer ends of regularly spaced alternating relatively long and shorter radii, each relatively long radius lying in the plane of crank arms of the crank shaft, a weight, means for supporting the weight at the side of the crank shaft opposite the primary reciprocating parts of the engine so that the weight can move along a path substantially in line with the line along which the center of gravity of the reciprocating parts shifts as the crank shaft is rotated, a roller supported by said weight for rotating about an axis parallel to the axis of rotation of the crank shaft and in position to have rolling contact with the peripheral surface of said cam, a bell crank fulcrumed adjacent to said weight and pivotally attached at one end of said weight, spring means acting on said bell crank to cause said weight to be held continuously in position to cause rolling contact of said roller with the peripheral surface of said cam, and means for adjusting the pressure on said spring.

2. A device for balancing the secondary forces in an internal combustion engine operating on the four stroke cycle, comprising a pair of cams carried by the crank shaft equi-distant from the intersection of the crank shaft with the line along which the center of gravity of the combined reciprocating parts of the engine shift as the crank shaft is rotated, each of said cams being elliptical in contour and having opposed relatively long radii of equal length lying in the plane of the crank arms of the crank shaft and having opposed shorter radii of equal length lying in planes at right angles to the plane of the relatively long radii, a pair of bell-cranks fulcrumed below the level of the crank shaft to swing about axes parallel to the axis of rotation of the crank shaft, said bell-cranks having arms overlapping below the axis of rotation of the crank shaft, a weight pivotally attached to said lapped portions of said arms of the bell-cranks and supported for movement toward and away from the axis of rotation of the crank shaft along a path substantially in line with that along which the center of gravity of the combined reciprocating parts of the engine shift as the crank shaft is rotated, rollers supported by the weight at opposite sides thereof and respectively in rolling contact with the peripheral surfaces of the corresponding cams, a rod extending loosely through openings in the ends of the remaining arms of said bell-cranks, and oppositely acting springs on the ends of said rod acting on said bell-cranks to tend to force said weight continuously toward the axis of rotation of the crank shaft, as and for the purpose described.

WILLIAM ROY TOMPKINS.